United States Patent Office 2,890,240
Patented June 9, 1959

2,890,240

ASPIRIN CRYSTALLISATION

William Edward Hamer, Marchwiel, Wrexham, and Gordon Victor Phillips, Rhos-y-Waen, Chirk, near Wrexham, England, assignors to Monsanto Chemicals Limited, London, England, a British company No Drawing. Application March 26, 1957
Serial No. 648,518

Claims priority, application Great Britain
March 28, 1956

6 Claims. (Cl. 260—480)

This invention relates to a process for the crystallisation of aspirin (acetyl salicylic acid).

Aspirin has been in wide use as an analgesic for over 50 years, and during that time the art of acetyl salicylic acid manufacture has developed extensively. The successful commercial production and sale of aspirin now requires the closest attention of the manufacturer to the yield and quality of his product, and much effort is still spent on research on the improvement of processes for aspirin production. As aspirin is produced in very large quantities, a slight improvement in yield will completely alter the economics of production, and if at the same time the quality of the product is maintained, a marked advance is achieved. Similarly if a slight improvement can be effected in the quality of the product without loss of yield, this is a major step forward.

Aspirin is usually prepared commercially by the acetylation of salicylic acid with acetic anhydride. Whatever the process adopted it is usual to crystallise the product, and much consideration has been given in the past to the choice of a suitable solvent and to the method and conditions adopted for the crystallisation, for the solvent chosen is critical in relation to the quality of the crystallised product and its yield. Purity and yield of the crystallised product are of course complementary; close consideration has to be given to the standard required for one in relation to the standard required for the other, and a compromise is always necessary. Apart from the purity of the product, other factors affecting its quality which have to be considered are the appearance and stability of the material and the suitability of its crystal form for tableting. Two of the solvents which have been widely employed for the crystallisation of aspirin in its commercial manufacture are methanol and benzene: a few others have been used, but many others, including various mixed solvents, have been tested and discarded.

Difficulty is caused in aspirin manufacture by a slight tendency for acetyl salicylic acid to deacetylate by hydrolysis both during purification by crystallisation and on storage after manufacture. As a result of this deacetylation, there is a tendency for the crystallised aspirin to contain free salicylic acid and for the salicylic acid content to increase during storage. In some instances acetic acid which is formed by deacetylation on storage can be detected by smell and a product which develops the odour of acetic acid on storage is certainly regarded as inferior. Much research has accordingly been directed in the past to finding a process giving a product which is odourless and remains so on storage, and whose tendency to form salicylic acid impurity is kept to a minimum.

Acetone has been briefly referred to in the literature as a solvent for the crystallisation of acetyl salicylic acid, but such references as there are contain no suggestion that acetone is a suitable solvent for the commercial production of aspirin, and indeed no successful commercial use of this solvent has been reported.

In an investigation into the possibility of using acetone as a crystallisation solvent for aspirin manufacture it has been found that if acetone is used for dissolving the aspirin and the solution is then cooled for the crystallisation, the crystal form of the aspirin obtained is very satisfactory for subsequent tableting. Acetone has a boiling point of 57.5° C. and the temperature difference which can in practice conveniently be applied for the crystallisation is in consequence comparatively small, a maximum temperature of about 55° C. being available for the dissolution stage, and a minimum of 20° C. or perhaps 10° C. for completion of the crystallisation. The solubility of aspirin in acetone at various temperatures has been determined and is given in the following table:

| Temperature ° C.: | Solubility of aspirin g./100 g. acetone |
|---|---|
| 55 | 62 |
| 50 | 57 |
| 40 | 46 |
| 30 | 37 |
| 20 | 29 |
| 10 | 22 |

It is evident from these figures that the temperature-solubility gradient of aspirin in acetone is not sufficiently steep for a crystallisation conducted using acetone as a solvent to give an adequately high direct yield for the crystallisation process to be economic without recycling a very large proportion of the mother liquors. It has in fact been determined that in order to achieve an economically acceptable recovery of aspirin of 94%, it is necessary using a dissolution temperature of above 50° C. and with cooling to 20° C., to recycle about 90% of the mother liquors from each crystallisation. This is disadvantageous for every time the aspirin in the mother liquors is reheated for dissolution of additional aspirin, a small amount of deacetylation occurs.

It has now been found that if the fall-out of aspirin crystal is increased by replacing acetone during the later stages of the crystallisation (that is, after a substantial amount of crystallisation has taken place) by an organic solvent in which aspirin is less soluble than it is in acetone at the relevant temperatures, then an economically acceptable recovery of an aspirin which is stable and which has a crystal form suitable for tableting can readily be obtained.

The process of the invention is accordingly one for the crystallisation of aspirin from its solution in acetone, in which acetone is replaced in the later stages of the crystallisation by an organic solvent in which aspirin is less soluble than it is in acetone (that is, less soluble at the temperatures concerned).

The solution for crystallisation is preferably of course as nearly saturated as possible at the temperature used for dissolution, which is conveniently high: thus the solution is preferably one substantially saturated at a temperature within the range 40°–57° C. before crystallisation commences. The acetone is conveniently removed by distillation under reduced pressure (which will of course remove heat from the solution: this heat can be replaced from outside while distillation proceeds) and using this procedure the replacing organic solvent needs to be one having a higher boiling point than acetone (and of course it should not form an azeotrope with acetone). Suitable replacing solvents are carbon tetrachloride and benzene. In practice the solution is seeded to induce commencement of crystallisation, and this is preferably done before any acetone is removed.

Preferably at least one third of the acetone is removed from the crystallising solution before any addition of the replacing organic solvent is made and a substantial part of the crystallisation has then already taken place. Acetone is preferably continuously removed during addition of the replacing organic solvent, so that the acetone is progressively replaced. The temperature of the replacing solvent added is conveniently room temperature, and the solvent used should be added slowly during the crystallisation so that crystal growth is interfered with as little as possible. It is usually convenient for the total quantity of the replacing solvent added to be about equal in weight to the total acetone in the original solution. When crystallisation is complete, the crystals are filtered or centrifuged off from the solvent containing them, washed with solvent, and dried. Suitable arrangements are made for the recovery of the solvents.

By suitable choice of solvent and procedure a recovery of crystallised aspirin of as high as 95% or more in a suitable crystal form for tableting can be obtained in one crystallisation.

The invention is illustrated by the following examples.

*Example 1*

Acetone (164 parts by weight) was placed in a flask fitted with a fractionating column of 3 theoretical plates, and in it was dissolved 100 parts of a typical crude aspirin obtained by the acetylation of salicylic acid with acetic anhydride and acetic acid, having a free salicylic acid content of 0.017% by weight: the dissolution was effected by warming the mixture to 53° C. during 30 minutes and holding the mixture at that temperature for 10 minutes. The temperature of the solution was then allowed to fall to 45° C., when seed crystals of aspirin were added and the solution slowly stirred. After this, removal of acetone under reduced pressure was commenced, the temperature of the solution being maintained at about 45° C. by a water bath. Distillation was carried out by gradually reducing to 250 mm. of mercury the pressure in the flask containing the solution. When half of the acetone had been removed and a substantial part of the aspirin present had crystallised, carbon tetrachloride (160 parts) at room temperature was slowly run in while the removal of acetone was continued until it was practically complete. Stirring was continued throughout the crystallisation. The crystallised solution was then cooled to 15° C. and filtered, and the aspirin crystals obtained were washed with 15 parts of carbon tetrachloride at 15° C. and vacuum dried at 55° C.

The crystallised aspirin, recovered in 96.1% yield, was in the form of small square plates very suitable for tableting. The free salicylic acid content of the product was determined (the colorimetric method for determining salicylic acid in aspirin described in British patent specification No. 6326/56 now Patent No. 798,633 was employed) and found to be 0.022% by weight. After keeping some of the product in an oven for 168 hours at 72° C., its salicylic acid content was again determined, and found to be 0.025%, indicating that the crystallised aspirin had a very marked stability.

*Example 2*

The procedure described in Example 1 was repeated, using 150 parts of benzene as replacing solvent and 15 parts of benzene for washing the filtered crystals, instead of the carbon tetrachloride.

The crystallised aspirin was obtained in 97.5% yield in the form of thick, almost square plates, having a free salicylic acid content of 0.021%, which increased on keeping in an oven at 72° C. for 168 hours to 0.03%.

What we claim is:

1. A process for the crystallisation of aspirin from its solution in acetone, in which acetone is replaced in the later stages of the crystallisation by an organic solvent selected from benzene and carbon tetrachloride.

2. A process according to claim 1, in which replacement of the acetone is effected by removing it by distillation under reduced pressure.

3. A process according to claim 2, in which the replacing organic solvent is carbon tetrachloride.

4. A process according to claim 2, in which the replacing organic solvent is benzene.

5. A process for the crystallization of aspirin from its solution in acetone, in which acetone is replaced in the later stages of the crystallisation by a material selected from benzene and carbon tetrachloride in an amount about equal in weight to the total amount of acetone originally used.

6. A process for the crystallisation of aspirin from a solution thereof in acetone, which solution is saturated at 40–57° C., in which acetone is replaced in the later stages of the crystallisation by an organic solvent selected from benzene and carbon tetrachloride.

References Cited in the file of this patent

UNITED STATES PATENTS 2,248,112   Neustein _____ July 8, 1941

OTHER REFERENCES

Tsakalotus: Bull. Soc. Chim., vol. 19, pp. 321–6 (1916).

Haas: Chem. Zentr., vol. II, p. 944 (1930).